United States Patent [19]

Smuckler

[11] Patent Number: 4,560,524
[45] Date of Patent: Dec. 24, 1985

[54] METHOD OF MANUFACTURING A POSITIVE TEMPERATURE COEFFICIENT RESISTIVE HEATING ELEMENT

[76] Inventor: Jack H. Smuckler, 9 Countryside La., Marblehead, Mass. 01945

[21] Appl. No.: 485,424

[22] Filed: Apr. 15, 1983

[51] Int. Cl.⁴ .................. B09C 71/02; H01H 37/00
[52] U.S. Cl. .................... 264/105; 264/174; 264/235; 264/236; 264/346; 264/347
[58] Field of Search ............... 252/511; 264/105, 174, 264/235, 236, 346, 347

[56] References Cited

U.S. PATENT DOCUMENTS

| | | | |
|---|---|---|---|
| 3,243,753 | 11/1962 | Kohler | 338/31 |
| 3,338,476 | 8/1967 | Marcoux | 222/146 |
| 3,410,984 | 11/1968 | Sandford et al. | 219/212 |
| 3,413,442 | 11/1968 | Buiting et al. | 219/390 |
| 3,435,401 | 3/1969 | Epstein | 338/214 |
| 3,673,121 | 6/1972 | Meyer | 252/511 |
| 3,733,385 | 5/1973 | Reddish | 252/511 |
| 3,823,217 | 7/1974 | Kampe | 264/105 |
| 3,836,482 | 9/1974 | Ling et al. | 252/511 |
| 3,858,144 | 12/1974 | Bedard et al. | 338/22 R |
| 3,861,029 | 1/1975 | Smith-Johannsen et al. | 29/611 |
| 3,914,363 | 10/1975 | Bedard et al. | 264/105 |
| 3,976,600 | 8/1976 | Meyer | 252/511 |
| 4,150,193 | 4/1979 | Burns, Jr. | 252/511 |
| 4,271,350 | 6/1981 | Crowley | 219/549 |
| 4,277,673 | 7/1981 | Kelly | 219/528 |
| 4,314,145 | 2/1982 | Horsma | 219/553 |
| 4,318,881 | 3/1982 | Sopory | 264/105 |
| 4,330,703 | 5/1982 | Horsma et al. | 219/553 |
| 4,334,351 | 6/1982 | Sopory | 264/105 |
| 4,350,652 | 9/1982 | Theysohn et al. | 264/104 |
| 4,400,250 | 9/1968 | Buiting et al. | 219/141 |

*Primary Examiner*—Jan Silbaugh
*Assistant Examiner*—Hubert C. Lorin
*Attorney, Agent, or Firm*—Lahive & Cockfield

[57] ABSTRACT

Crystalline polymers having a relatively high melt index and low structured carbon black together produce positive temperature coefficient material which can attain suitable volume resistivity with a greatly reduced annealing time. Temperature self-regulating resistive heating elements may be made with the material in a continuous process where annealing is conducted in a heated zone while the extruded element is in motion or during a short interval when its motion is interrupted.

11 Claims, 1 Drawing Figure

METHOD OF MANUFACTURING A POSITIVE TEMPERATURE COEFFICIENT RESISTIVE HEATING ELEMENT

BACKGROUND OF THE INVENTION

This invention relates to a new method of manufacturing temperature self-regulating electric circuit elements which method is fast and inexpensive and to positive temperature coefficient compositions. More particularly, the invention relates to new positive temperature coefficient ("PTC") compositions which can be annealed to attain a suitable volume resistivity in a much shorter time than those previously known.

PTC compositions and devices which exploit them are well known in the art. When a constant voltage is applied across the composition, the current and the resistance stay approximately constant so long as the PTC composition is at low temperature. When the PTC composition heats up, it reaches a "switching" temperature or temperature range where its resistance increases dramatically (six fold or more), and since the voltage is constant, current decreases. Accordingly, PTC circuits can act essentially as temperature self-regulating devices.

The problem with known heating elements comprising PTC compositions is that the costs of manufacturing are too high. Generally, thermostatic control of conventional resistive heating elements has been a more economical approach to making heating blankets and the like.

PTC compositions consist of blends of a crystalline polymer with a high conductivity material such as carbon black. See, e.g., U.S. Pat. No. 3,410,984. Early PTC compositions, such as those disclosed in U.S. Pat. No. 3,976,600, required up to 50% conductive carbon black in order to obtain the PTC effect. When such high carbon black loadings were used, a fairly sharp switching temperature could be achieved, but the resulting blend was inflexible and deteriorated in use upon thermal cycling. Lower levels of carbon black loading were tried as disclosed, for example, in U.S. Pat. No. 3,861,029 (less than 13% carbon black). One problem with this approach was that the resistivity of the carbon loaded material was too high. However, if one annealed the polymer-carbon black blend at 250° F. or higher for period upwards of 24 hours it was possible to reduce volume resistivity from approximately $10^9$ ohm-cms to about $10^3$ ohm-cms.

The conductive material added to the polymer in almost all of the prior art PTC compositions is high conductivity carbon black. The only exception appears to be U.S. Pat. No. 4,277,673 which suggests using high resistivity carbon blacks rather than high conductivity carbon blacks to shorten annealing time. While other factors such as percent crystallinity of the polymer matrix have been discussed as being of importance in achieving optimum PTC results, it is believed that none of the prior art PTC compositions have achieved flexibility and sharp switching temperatures without lengthy annealing procedures.

SUMMARY OF THE INVENTION

It has now been discovered that the annealing or "thermal structuring" times required in the manufacture of PTC compositions can be greatly reduced by using as a matrix material a high melt index polymer or a mixture of polymers having a high melt index. It has also been discovered that the use of low structure carbon black also promotes short annealing times. Generally, if the melt index of the polymer or polymer blend constituting the matrix is greater than one, annealing time may be reduced to less than the two hour minimum of the prior art. In preferred compositions less than five minutes of thermal annealing is sufficient.

As a result of these discoveries a new process for producing temperature self-regulating elements has been developed which substantially eliminates the need of the lengthy annealing procedure required in the prior art processes. A high melt index crystalline polymer is blended with a carbon black, the resulting PTC composition is placed in contact with a pair of conductive electrodes, and the resulting article is annealed for a period of less than two hours to reduce the volume resistivity of the PTC material to the useful range, generally below about 100,000 ohm-cm. Preferred annealing temperatures are from 250°–400° F.

In its broadest aspects, the PTC composition used in the process of fabricating temperature self-regulating heating elements of the invention comprises a mixture of a carbon black and a crystalline polymer having a melt index greater than one. Polymers having a melt index greater than 1.2 are preferred, and those having a melt index between about 1.5 and 10 work well. Polymers having a melt index between about 10 and 100 may be used as a component of the PTC composition. The carbon black should comprise less than 20%, preferably less than 15% of the composition. Both "high structure" conductive carbon black and "low structure" carbon blacks can be utilized in the invention as can high resistance carbon blacks. The low structure carbon black is preferred because its use contributes to reducing processing time. Suitable crystalline polymers include, for example, polyolefins including ethylene-propylene copolymers, fluoropolymers, and terpolymers containing non-conjugated dienes. Crystalline polyethylene works well. Mixtures of such polymers are useful so long as the resulting melt index is greater than one.

In another aspect, the invention provides a novel temperature self-regulating heating element comprising an insulating jacket enclosing at least two conductive elongate electrodes separated by and in electrical contact with a positive temperature coefficient material comprising a blend of a crystalline polymer having a melt flow index greater than one and not more than about 20% by weight carbon black. The electrodes are preferably arranged as parallel rectilinear conductors disposed uniformly apart within a matrix of the PTC material.

Accordingly, it is an object of the invention to provide an improved article of the type described which is less expensive to manufacture and to provide novel temperature self-regulating heating pads, blankets, and the like. Another object is to provide an improved method of manufacture of elements wherein required annealing time is greatly decreased or substantially eliminated. Still another object is to provide a temperature self-regulating element and a process for its manufacture which involves essentially continuous annealing conducted simultaneously with or shortly after extrusion of the PTC material about the electrodes. Thus, the invention contemplates a continuous process wherein annealing is conducted in a heated zone while the extruded temperature self-regulating element is in motion or during a short interval when its motion is interrupted.

BRIEF DESCRIPTION OF THE DRAWING

These and other objects and features of the invention will be apparent from the following detailed description and from the drawing wherein the sole FIGURE illustrates a temperature self-regulating heating element embodying the invention.

DESCRIPTION

Figure 1:
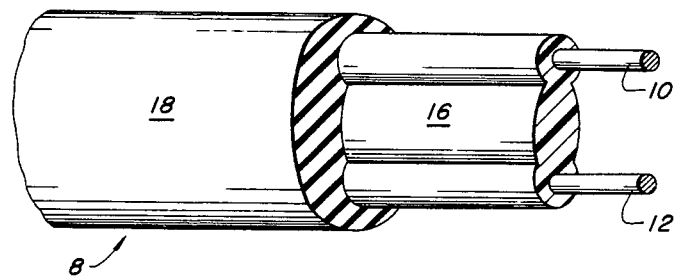

The invention is based primarily on the discoveries that the annealing times required for the production of useful positive temperature coefficient compositions can be shortened from hours to minutes or even substantially eliminated as a separate step by proper selection of matrix polymers and carbon black materials.

While PTC compositions have been known for a number of years, it is believed that all prior art PTC compositions have employed as matrix materials conventional crystalline thermoplastics of the type recommended for extruding insulated wire. The Union Carbide product literature "Chemicals and Plastics Physical Properties" lists five grades of low density polyethylene suitable for wire extrusion, each of which has a melt index less than one. U.S. Industrial Chemicals Co., a division of National Distillers and Chemicals Corp., lists three low density polyethylenes for use in wire applications in their bulletin "Polyolefins for Wire and Cable." These polyethylenes have melt indices which range from 0.25 to 1.2. Melt index is a measure of the amount of polymer passing per unit time through a standard orifice under a standard pressure. It is related to melt viscosity. Generally, the lower the melt index, the higher the molecular weight of the polymer. To the inventor's knowledge, standard polymers designed for wire extrusion typically have fractional melt indices and the melt index of the crystalline polymer matrix material has never been regarded as important to PTC composition properties. It is accordingly believed that a crystalline polymer with a melt index greater than one has never been employed in the prior art as the matrix polymer of a PTC composition. It is also believed that no known PTC composition which requires annealing has been heretofore produced with annealing time less than two hours.

Carbon blacks are one of a group of materials having the ability to impart electrical conductivity to polymer systems. As discussed in chapter 4 of "Conductive Rubbers and Plastics", R. H. Norman (American Elsevier, 1970), carbon blacks tend to be found, not as individual particles, but rather as chain-like structures. High structure carbon blacks, that is, those with long chains of particles such as Cabot Corporation's Vulcan XC-72 (the most commonly used carbon black in PTC compositions), impart greater electrical conductivity to polymer systems than do low structured carbon blacks, that is, those with short chains (such as, Cabot Corporation's Regal 300 or Regal 660). Carbon blacks may also include chemisorbed oxygen compounds on their surfaces. The greater the amount of chemisorbed oxygen compounds, the lower the conductivity. The highly electrically resistive carbon blacks disclosed in U.S. Pat. No. 4,277,673 have a large concentration of chemisorbed oxygen compounds. These carbon blacks do not conduct electricity well, irrespective of their high or low structure, because of the chemisorbed compounds.

As used herein the phrase "crystalline polymer" means a polymer that has at least 20% crystallinity, and preferably at least 50% crystallinity as determined by x-ray diffraction.

As used herein, the phrase "low structured carbon black" means a carbon black having a dibutyl phthalate (DBP) absorption less than 100 ml DBP per 100 g of the carbon black. High structure carbon black has many void spaces which can absorb oil. Cabot Corporation has developed an instrument called the Cabot Absorptometer designed to measure the amount of oil absorbed by a particular carbon black sample. Using such instruments and dibutyl phthalate as the oil, the DBP absorption in ml/100 g may be determined readily for any carbon black. High structured grades have absorption value generally greater than 100; low structured grades have values generally below about 100. For example, the high structured Vulcan XC-72 has a DBP adsorption value of 178 ml/100 g, whereas the low structured grades Regal 660 and Regal 300 have values of 60 ml/100 g and 72 ml/100 g, respectively.

A crystalline polymer or a mixture of such polymers with a high melt index, if used in place of the polymers of the prior art, can greatly reduce the annealing time required to attain useful volume resistivity. Furthermore, low structure carbon black has a similar although less dramatic effect. These discoveries may be exploited as disclosed below to achieve significant improvements in the manufacture of temperature self-regulating resistance heating elements. Use of the process in turn allows more cost effective production of such elements.

The PTC composition is blended generally as disclosed in the prior art. See, for example, U.S. Pat. No. 4,277,673 and U.S. Pat. No. 3,410,984, the disclosures of which are incorporated herein by reference. Thus, a crystalline polymer or mixture of polymers selected in accordance with the teachings set forth above is mixed with a carbon black, preferably a low structure carbon black, in a heated, high intensity mixer. The carbon black content of the blend should not exceed 20% and typically will be less than 15%. Typically, a substance which accelerates formation of cross links induced by irradiation will also be included. Antioxidants and other conventional additives may also be introduced. The components are mixed for at least five minutes to optimize homogeneity of the resulting composition. The composition is then fed to a dicer in preparation for extrusion.

The blended PTC composition is next extruded onto a pair of electrodes, e.g., copper wire electrodes, which are maintained by the extrusion die at the point of exit of the extrudate at constant separation. The extrudate is then annealed, e.g., in an oven at 250°–400° F., for a period not exceeding two hours. In most instances, depending on the materials selcted, a five minute heat treatment at 300° F. will be sufficient. Because of the reduced annealing time it is easier to maintain constant the distance separating the electrodes within the PTC matrix.

With certain embodiments of the composition of the invention it will be possible to eliminate entirely the annealing step as a distinct step of the process. Thus, when certain preferred PTC compositions made in accordance with the teaching of the invention are employed, the heat supplied to the composition by the extrusion device to melt the blend itself will be sufficient to lower the volume resistivity of the composition to the useful range, and little or no additional heat treatment of the extrudate will be required. In any event, by selection of PTC components in accordance with this disclosure, the duration of any annealing step required can be easily limited to less than one hour, less than 30 minutes, or less than 5 minutes as desired. This means that in a commercial application of the manufacturing process of the invention any annealing required may be conducted on extrudate in transit, during a short interval when its motion is interrupted, or after winding the product on spools or the like. The thermal treatment, if conducted as a step separate from the extrusion step, is preferably done after a high melting point insulating jacket is extruded about the PTC core.

After the heat treatment the PTC composition is cross linked by irradiation. As is well known, cross-linking prevents movement of the electrodes during thermal cycling of the finished heating element and toughens the extruded PTC composition.

The drawn figure illustrates a resistive heating element 8 such as might be fabricated in accordance with the process of the invention. Electrodes 10 and 12 are substantially parallel and separated by the cross-linked PTC composition 16. The PTC composition 16 is surrounded by insulating layer 18, applied by extrusion. Since the annealing time of the PTC composition is very short, the location of electrodes 10 and 12 may be controlled better. Because of this, volume resistivity across the PTC composition 16 is more uniform along the length of the cable.

Current flows between the electrodes 10 and 12 through the PTC material 16 causing resistive heating. Heating raises the temperature of PTC composition 16 until its switching temperature is reached. At that temperature, the resistance of PTC composition 16 increases dramatically thereby shutting off or greatly reducing the current between electrode 10 and 12. As the current decreases, the resistive heating also decreases and the temperature of the PTC composition declines. When the temperature of the composition falls below the switching temperature, the resistance decreases and the current again increases. This thermal cycling allows the cable to act as a temperature self-regulating device.

In practice, the switching temperature is a temperature range, and the effectiveness of the PTC composition is determined by the slope of the resistivity versus temperature curve. The greater the slope, the better the PTC material.

The precise values of the room-temperature volume resistivity and switching temperature volume resistivity of a given resistive heating element of the invention will differ depending on the type and percent loading of the carbon black employed, and depending also on the type of polymer or polymer blend used as the matrix material. For any given resistive heating element, the change in volume resistivity within the temperature range of use (approx. 0°-95° C.) is substantially uniform after annealing and cross-linking. Typically, PTC compositions formulated as disclosed herein will have a volume resistivity greater than about $10^7$ ohm-cm before annealing, and a volume resistivity less than $10^5$ ohm-cm after the short thermal treatment.

For electric blanket and heating pad manufacture, a preferred temperature self-regulating heating element will have a power consumption in operation in the vicinity of 0.5-1.5 watt/foot. For standard U.S. 120 volt house current, a resistance of the PTC material of 4,400 ohm per foot at operating temperature will result in a power consumption of 1.0 watt. This resistance value is achieved, for example, in a cable wherein the electrodes are separated by a distance of 0.2 cm and the PTC composition is 0.02 cm thick, by employing a PTC composition having a volume resistivity of 44,000 ohm-cm at the operational equilibrium temperature.

The following non-limiting examples will further illustrate the invention.

The procedure for examples 1-5 was as follows. Two-hundred gram batches of PTC blends comprising the components set forth below were mixed on a heated two-roll mill by banding the polymer on the mill and adding slowly carbon black of the type set forth below. The compositions were mixed for an additional five minutes after which they were sheeted off and allowed to cool at room temperature. 10 gram samples of the mill sheet were placed between 7"×7" chrome plates. The chrome plates were allowed to heat up in a 350° F. Carver Press for 30 seconds and then pressed at 5,000 pounds pressure for an additional 30 seconds. The chrome plates containing the pressed film were then plunged into cold water. A one inch square piece of the cooled sheet was measured for thickness and placed between polished brass plates held together by an electrically insulated C-clamp. The resistance of the film was determined using a Fluke 8022 Multimeter. Volume resistivity was calculated based on the resistance reading and the dimensions of the film. The PTC compositions were annealed by placing the respective pressed films on Teflon sheets, heating in an oven at 300° F. for the times specified, and cooling to room temperature. Resistivity was then measured as previously discussed.

EXAMPLE 1

This example was designed to assess the effect of different types of carbon black in a low melt index polymer. A commercially available crystalline polymer, low density polyethylene (U.S. Industrial Chemical Company NA-107, 0.4 Melt Index) was utilized as the matrix polymer. Four different carbon blacks (a high structure, two low structure, and high resistance) were tested to determine the relative effect on volume resistivity and its relationship to annealing time. The carbon blacks, all manufactured by Cabot Corporation, were Vulcan XC-72, (high structure conductive carbon black) Regal 660 and Regal 300 (low structure carbon blacks) and Black Pearls L (high resistance carbon black). All of the following percentages are expressed as percent by weight. Table 1 sets forth the results of this experiment.

TABLE 1

|  | Formula (%) | | | |
|---|---|---|---|---|
|  | 1 | 2 | 3 | 4 |
| NA-107 (0.4 Melt Index) | 80 | 80 | 80 | 80 |
| High Structure Vulcan XC-72 | 20 | — | — | — |
| Low Structure | | | | |
| Regal 660 | — | 20 | — | — |
| Regal 300 | — | — | 20 | — |
| High Resistance Black Pearls L | — | — | — | 20 |
| Volume-Resistivity (ohm-cms) for: | | | | |
| Pressed Film | >1.3B | 2.3M | >1.3B | >1.1B |
| Pressed and Oven heated film (1 hour at 300° F.) | >1.4B | 67K | 710M | >1.0B |

$B = 10^9$
$M = 10^6$
$K = 10^3$

As can be seen from Table 1, the composition made from the Regal 660 low structure carbon black had the lowest pressed film resistivity and was affected most dramatically by the one hour anneal. Regal 300, another low structure carbon black, when used with the fractional melt index polymer, produced a composition whose resistivity halved in one hour. Formula 1 is illustrative of the prior art PTC compositions containing a fractional melt index crystalline polymer mixed with a high structure conductive carbon black. Formula 4 is similar to the PTC composition disclosed in U.S. Pat. No. 4,277,673 which teaches that annealing times may be shortened using high resistivity carbon blacks. As can be seen from Table 1, compositions containing low structure carbon black have significantly relaxed annealing requirements as compared with composition containing either high resistivity or high structure conductive carbon black.

EXAMPLE 2

This example was conducted to show the difference between using fractional melt index crystalline polymers and higher melt index crystalline polymers. Four different low density crystalline polyethylenes were used: United States Industrial Chemical Company's NA-107 (0.4 Melt Index), NA-225 (1.8 Melt Index), NA-201 (5.0 Melt Index), and NA-117 (8.5 Melt Index). The high structure conductive carbon black Vulcan XC-72 was used in each of the compositions.

TABLE 2

|  | Formula (%) | | | |
|---|---|---|---|---|
|  | 5 | 6 | 7 | 8 |
| NA-107 (0.4) | 85 | — | — | — |
| NA-225 (1.8) | — | 85 | — | — |
| NA-201 (5.0) | — | — | 85 | — |
| NA-117 (8.5) | — | — | — | 85 |
| Vulcan XC-72 | 15 | 15 | 15 | 15 |
| Volume-Resistivity (ohm-cms) for: | | | | |
| Pressed film | >1.5B | 9.2K | 240 | 230 |
| Pressed and Oven heated film (1 hour at 300° F.) | >1.5B | 2.1K | 220 | 280 |

Composition 5 illustrates a prior art composition having 85% low density polyethylene (Melt Index 0.4) with 15% high structure carbon black. As shown, the resistivity of the pressed film was greater than 1.5 billion ohm-cms. As expected, annealing at 300° F. for one hour did not appreciably change the volume resistivity. Composition 6 using the 1.8 Melt Index polyethylene in place of the 0.4 Melt Index polyethylene of Composition 5 exhibited a pressed film resistivity of 9,200 ohm-cms, and after one hour annealing, the resistivity decreased to 2,100 ohm-cms. When higher melt index polymers such as NA-201 (composition 7) and NA-117 (composition 8) were used, the one hour annealing was unnecessary as the pressed films had volume resistivities of 240 and 230 ohm-cms, respectively, and the annealing did not appreciably change the resistivity. This Example illustrates that high melt index crystalline polymers greatly reduce the time needed for annealing PTC compositions.

EXAMPLE 3

This Example illustrates that a blend of polymers can be used in the practice of the invention provided the resulting melt index is greater than one. The PTC compositions for this experiment were made from a blend of NA-107 (Melt Index 0.4), NA-117 (Melt Index 8.5) and 14% high structure carbon black.

TABLE 3

|  | Formula (%) | | | |
|---|---|---|---|---|
|  | 9 | 10 | 11 | 12 |
| NA-107 (0.4) | 86 | 43 | 21.5 | — |
| NA-117 (8.5) | — | 43 | 64.5 | 86 |
| Vulcan XC-72 | 14 | 14 | 14 | 14 |
| Volume-Resistivity (ohm-cms) for: | | | | |
| Pressed film | >1.5B | >1.8B | 470 | 830 |
| Pressed and Oven heated film (1 hour at 300° F.) | >1.5B | 250K | 680 | 750 |

Composition 9 illustrates the prior art wherein the melt index of the polymer is below one. As shown, both the resistivity of the pressed film and that of the composition annealed for one hour were greater than 1.5 billion ohm-cms. When a one to one mixture of the 0.4 and 8.5 Melt Index polymers were tested (Composition 10), the pressed film resistivity was greater than 1.8 billion, but with one hour of annealing the resistivity dropped to 250,000. The resistivity of compositions 11 and 12 before annealing were so low that the one hour annealing period was unnecessary and did not appreciably affect room temperature volume resistivity.

EXAMPLE 4

This example illustrates the properties of blends of ethylene vinyl acetate and high melt index low density polyethylenes. The ethylene vinyl acetate (U.S. Industrial Chemical Company UE-630) was blended with polyethylenes (NA-107, 0.4 Melt Index and NA-270, 70 melt index) and Vulcan XC-72. As can be seen from Table 4, the ethylene vinyl acetate-low melt index polyethylene blend (composition 13), even after annealing for one hour, had a resistivity of 530,000 ohm-cms.

TABLE 4

|  | Formula (%) | | | | |
|---|---|---|---|---|---|
|  | 13 | 14 | 15 | 16 | 17 |
| UE-630 | 13 | 13 | 13 | 13 | 13 |
| NA-107 (0.4) | 67 | 50 | 33.5 | 17 | — |
| NA-270 (70) | — | 17 | 33.5 | 50 | 67 |
| Vulcan XC-72 | 20 | 20 | 20 | 20 | 20 |
| Volume-Resistivity (ohm-cms) for: | | | | | |
| Pressed film | 520M | 480K | 38K | 49K | 84K |
| Pressed and Oven heated film (1 hour at 300° F.) | 530K | 1.0K | 1.1K | 1.1K | 1.5K |

The PTC composition blends of the present invention (compositions 14–17) having melt flow indices greater than 1.0 exhibit resistivities in the 1,000 ohm-cm range after only one hour of annealing. This example illustrates that blends of dissimilar polymers can be used to practice the present invention provided they have sufficient crystallinity and the melt index of the blend is above the fractional level.

EXAMPLE 5

This example was designed to assess the effect on annealing efficiency of using high and low structure carbon blacks and high resistance carbon black. The matrix was NA-117 (8.5 Melt Index), a low density polyethylene. The carbon blacks used and the results are set forth below.

TABLE 5

|  | Formula (%) | | | |
| --- | --- | --- | --- | --- |
|  | 18 | 19 | 20 | 21 |
| NA-117 (8.5) | 80 | 80 | 80 | 80 |
| High Structure Vulcan XC-72 | 20 | — | — | — |
| Low Structure |  |  |  |  |
| Regal 660 | — | 20 | — | — |
| Regal 300 | — | — | 20 | — |
| High Resistance Black Pearls L | — | — | — | 20 |
| Volume Resistivity (ohm-cms) for: |  |  |  |  |
| Pressed Film | 260 | 5.5K | 950 | 87M |
| Pressed and Oven Heated Film (1 hour at 300° F.) | 160 | 1.9K | 580 | 230K |

As can be seen from Table 5, the resistivity of the pressed films for compositions 18 and 20, containing Vulcan XC-72 and Regal 300, respectively, did not change appreciably during annealing. The resistivity was so low for these pressed films that further heat treatment was unnecessary. Composition 19, which contained low structure Regal 660, did decrease in resistivity on annealing, but its initial resistivity was quite low. The high resistivity carbon black also showed a marked decrease in resistivity within the one hour annealing.

The results, when compared with those set forth previously, illustrate that the use of high melt index crystalline polymers for PTC compositions improves annealing time dramatically, and furthermore that the use of low structured carbon black in combination with the high melt index material has significant advantages.

EXAMPLE 6

Fifty pound quantities of the compositions set forth below (22 and 23) were prepared on a heated 60" two-roll mill. The low density polyethylene, NA-117 (8.5 Melt Index), was first banded on the mill then the carbon black and an antioxidant (Cieba-Geigy Irganox 1010) were added slowly. After the carbon black and antioxidant were incorporated into the polymer, an irradiation accelerator (TMPTMA) was added slowly. The composition was mixed on the mill for about five minutes, sheeted off the mill, run through cooling water, and diced. The diced composition was placed into a 2 inch extruder equipped with a screw and a wire die. The three heating zones in the extruder were heated to 350° F. while the wire die was heated to 400° F. The composition was extruded onto 24 gauge stranded wire (seven strands of tinned 32 gauge copper wire) at a coating thickness of approximately 10 mils (0.010 inches). The wire and enveloping PTC composition was extruded at the rate of about 500 feet per minute, run through a water cooling trough, and wound on a reel. One foot samples of the extrudate were annealed in a 300° F. oven for approximately one minute, five minutes, and one hour. The samples were allowed to cool to room temperature before testing for volume resistivity.

To measure resistivity, a one-half inch section of the coating was removed from one end of each of the wire samples to expose the conductor, and a one inch section of the coating about two inches from the end was painted with conductive silver paint. After the conductive paint dried, alligator clips were attached to the painted section of the wire and to the exposed end. The resistance of the one inch cylinder of 10 mil thick coating under the paint was thereby determined, and the volume resistivity could be calculated.

TABLE 6

| Formula | 22 | 23 |
| --- | --- | --- |
| NA-117 (8.5 Melt Index) | 83 | 79 |
| High Structure Vulcan XC-72 | 14 | — |
| Low Structure |  |  |
| Regal 300 | — | 18 |
| TMPTMA | 2 | 2 |
| Antioxidant | 1 | 1 |
| Volume-Resistivity (ohm-cms) for: |  |  |
| Extruded | >380M | >380M |
| Extruded and Oven Heated (1 minute at 300° F.) | >380M | 900K |
| Extruded and Oven Heated (5 minutes at 300° F.) | >380M | 16K |
| Extruded and Oven Heated (1 hour at 300° F.) | 500K | 18K |

As is evident from Table 6, upon extrusion both compositions had volume resistivities in excess of 380,000,000 ohm-cms. After annealing for one minute, the resistivity of composition 22 did not change appreciably while the resistivity of the composition 23 decreased by a factor of approximately 400. After five minutes of heating at 300° F., the resistivity of the high structure wire still had not changed while the resistivity of the low structure wire had decreased by an additional factor of 50 to a level of approximately 1/2,000 of its resistivity as extruded. When the high structure composition was annealed for one hour, its resistivity decreased while the resistivity of the low structure compound stayed approximately constant after the five minute mark.

EXAMPLE 7

Compositions 24 and 25, prepared as disclosed generally in example 6, were extruded onto 24 gauge stranded wire. However, annealing was conducted continuously as the extruded wire was passed through a ten foot long heated tunnel at a rate of 14 feet/minute. The resistance time of the wire in the tunnel was accordingly about 51 seconds. The tunnel consisted of a pair of coaxial pipes, 4 inches and 6 inches in diameter respectively, one end of which was covered by a piece of aluminum foil having a central opening one inch in diameter through which the thermally treated wire passed.

A Dayton Flameless Production Blower was used to supply 700°-800° F. air at a rate of 1600 cfm into the inner cylindrical heating zone. A thermometer placed within the inner pipe adjacent its exit indicated that the temperature was 280° F. The resistivity of this annealed wire sample was measured as set forth in example 6.

The materials used and the results are set forth below.

TABLE 7

|  | Formula (%) | |
| --- | --- | --- |
|  | 24 | 25 |
| NA-208 (Melt Index of 22) | 79 | — |
| NA-246 (Melt Index of 35) | — | 83 |
| High Structure Vulcan XC-72 | — | 14 |
| Low Structure Regal 300 | 18 | — |
| TMPTMA | 2 | 2 |
| Antioxidant | 1 | 1 |
| Volume Resistivity (ohm-cm) for |  |  |
| Extruded | >380M | >380M |
| Annealed (14 ft/min) | 250K | 140K |

As is evident from table 7, the volume resistivity of both wires was reduced in transit by factors greater than $10^3$ after only about a 51 second exposure to a temperature on the order of 300° F. in the tunnel. This example demonstrates that continuous annealing in accordance with the invention is feasible. Of course, in a commercial wire forming process, two conductors would normally be used in the extrusion.

From the foregoing it is apparent that the high structure, high melt index composition comprises an excellent PTC material and is characterized by a significantly shorter annealing time than that known in the prior art. It is also evident that the low structure-high melt index compositions can be annealed in even shorter times. The annealing time of such composition can be less than five minutes as compared with greater than at least two hours for the prior art.

Other embodiments are within the following claims.

What is claimed is:

1. A process for producing a positive temperature coefficient resistance element comprising the steps of:
   A. blending a polymer having at least about 20% crystallinity as determined by X-ray diffraction and having a melt flow index of at least one with an effective amount of up to about 20% by weight of carbon black to attain a suitable volume resistivity when voltage is applied to the resulting composition;
   B. placing the composition of step A in contact with a pair of spaced-apart conductive electrodes;
   C. maintaining the product of step B at a temperature above the melting point of the polymer component of the blend of step A for no more than about one hour and then cooling to produce an approximately constant room temperature volume resistivity of the composition of less than about 100,000 ohm-cm and thereby obtain a temperature self-regulating resistance element.

2. The process of claim 1 wherein the polymer fraction of the blend of step A has a melt flow index greater than 1.2.

3. The process of claim 1 wherein the polymer fraction of the blend of step A has a melt flow index between 1.5 and 10.

4. The process of claim 1 wherein the melt flow index of a polymer blended in step A is between about 10 and 100.

5. The process of claim 1 wherein said crystalline polymer is selected from a group consisting of polyolefins, fluoropolymers, copolymers, terpolymers containing non-conjugated dienes, and mixtures thereof.

6. The process of claim 1 wherein in step C the product of step B is maintained at said temperature for less than about 5 minutes.

7. The process of claim 1 wherein the carbon black blended in step A is a low structure carbon black having a dibutyl phthalate absorption of less than about 100 ml/100 g of carbon black.

8. The process of claim 1 wherein the carbon black blended in step A is present at a level less than about 15% by weight.

9. The process of claim 1 comprising a continuous process wherein step B is effected by extruding said composition about elongate electrodes, and step C is effected by exposing the resulting extrudate to said temperature as said extrudate passes through a heated zone.

10. The process of claim 1 comprising the additional step of cross-linking said composition after step c.

11. A process for producing a positive temperature coefficient resistance element comprising the steps of:
    extruding a positive temperature coefficient composition over a pair of spaced-apart elongate conductive electrodes, said positive temperature coefficient composition comprising a blend of
    a polymer having at least about 20% crystallinity as determined by X-ray diffraction and having a melt flow index of at least one and
    an effective amount of up to 20% by weight of carbon black to attain a suitable volume resistivity when voltage is applied to the resulting composition; and
    maintaining the positive temperature coefficient composition at a temperature above the melting point of the polymer in the blend for a sufficient amount of time less than one hour, and then cooling, to produce an approximately constant volume resistivity in said positive temperature coefficient composition to convert said composition and electrodes into a useful positive temperature coefficient resistance heating element.

* * * * *